United States Patent Office 3,500,947
Patented Mar. 17, 1970

3,500,947
GAS-CUSHION VEHICLES WITH WAVE RESTRAINING MEANS FOR OPERATION OVER WATER
Christopher Sydney Cockerell, Southampton, England, assignor to Hovercraft Development Limited, London, England, a British company
Filed Feb. 7, 1968, Ser. No. 703,603
Claims priority, application Great Britain, Feb. 27, 1967, 9,230/67
Int. Cl. B60v 1/00
U.S. Cl. 180—116          6 Claims

ABSTRACT OF THE DISCLOSURE

The undersurface of the body of an air-cushion vehicle operating over water carries rigid structure adapted to reduce height of large waves encountered by the vehicle, for example, by severing the wave tops, so that a clearance is maintained between the vehicle body and the water. The clearance provides for an exchange flow of cushion air from one side of the wave to the other, thus restraining the wave from sweeping air within the cushion space.

---

This invention relates to gas-cushion vehicles for operation over water, that is to say, to vehicles which, in operation, are supported at least in part above the water over which they travel by a cushion of pressurised gas contained in a space (the cushion space) formed between the vehicle body and the water.

In operation such gas-cushion vehicles often encounter waves large enough to contact the bottom surface of the vehicle body and, because the waves are moving rearward relative to the vehicle, the waves sweep out substantial volumes of cushion gas from the cushion space. This displacement of cushion gas results in a reduction in cushion pressure at the front end of the cushion space and an increase in cushion pressure at the rear end thereof and the cushion pressure differential creates a moment which tends to pitch the front end of the vehicle into the water.

It is an object of the invention to provide a gas-cushion vehicle wherein this tendency is at least reduced and according to the invention a gas-cushion vehicle for operation over water is provided with means for restraining waves encountered by the vehicle from contacting the major part of the bottom surface of the vehicle body and adapted so as to reduce the height of a wave so that a clearance is maintained between said bottom surface and the wave whereby cushion gas may flow from one side of the wave to the other side thereof.

According to one particular form of the invention, the said restraining means maintains said clearance by severing the top of a wave which would otherwise contact the bottom surface of the vehicle body.

Where the vehicle is amphibious, the said restraining means may also be adapted to serve as at least one pad for support of the vehicle when the latter is at rest on a land surface.

That portion of the bottom surface of the vehicle body extending to the rear of the said means may be recessed so as to increase the gap between the vehicle body and a wave which has had its height reduced.

According to another particular form of the invention, the said restraining means may comprise providing the vehicle body with a stepped bottom surface, the step being disposed at the forward end of the cushion space.

The invention also resides in a method of restraining waves from sweeping cushion gas from the cushion space, comprising reducing the height of such a wave as it enters the cushion space so that a clearance is maintained between said bottom surface and said wave whereby cushion gas may flow from one side of said wave to the other side thereof.

Figure 1:
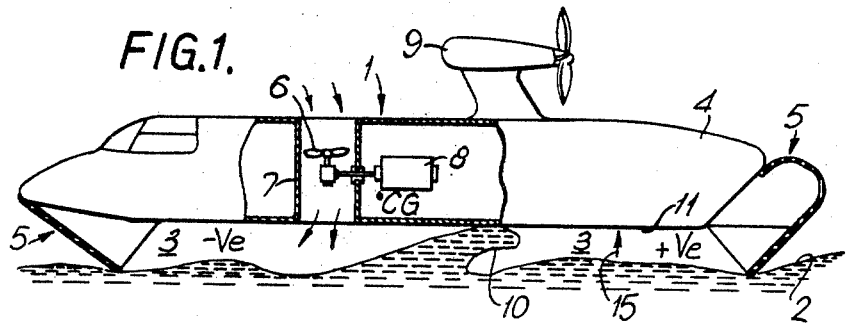
Figure 2:
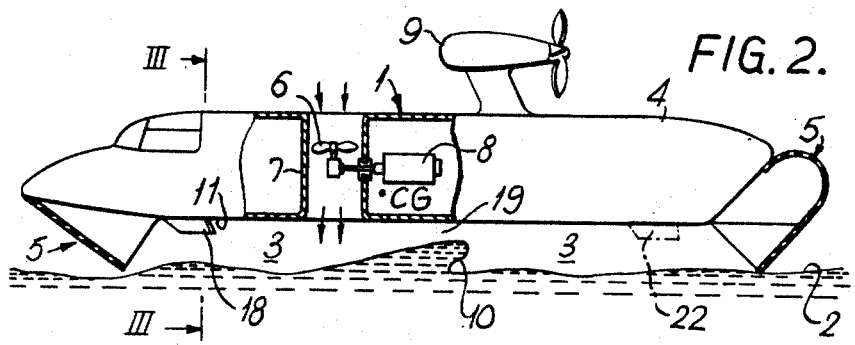
Figure 3:
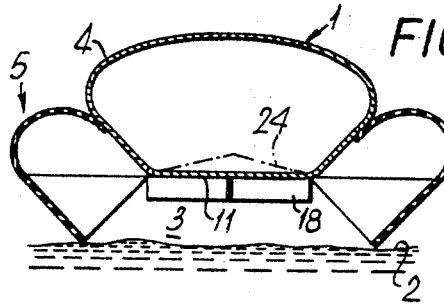
Figure 4:
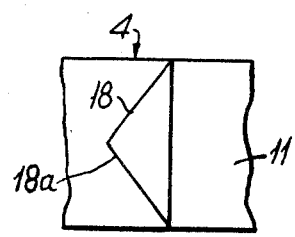
Figure 5:

An embodiment of the invention will now be described by way of example with reference to the accompanying drawings wherein:

FIGURE 1 is a side view, in section, of a gas-cushion vehicle of known form,

FIGURE 2 is a similar view and illustrates the vehicle of FIGURE 1 modified according to one embodiment of the invention, FIGURE 3 is a section, to an enlarged scale, taken on the lines III—III of FIGURE 2, FIGURE 4 is a fragmentary bottom plan view of the vehicle of FIGURE 2 looking upward in the vicinity of the lines III—III of FIGURE 2, and FIGURE 5 is a side view illustrating the vehicle of FIGURE 1 modified according to another embodiment of the invention.

With reference first to FIGURE 1, a gas-cushion vehicle 1 operating over water 2 is supported thereover by a cushion of pressurised air contained in a (cushion) space 3 formed between the vehicle body 4 and the water 2. The air cushion is contained beneath the vehicle body 4 by a flexible wall or skirt 5 extending around the periphery of the vehicle body.

In further detail, the vehicle 1 is of the so-called plenum-chamber type, air forming the cushion being drawn in from the atmosphere by a fan 6 disposed in a duct 7 and driven by an engine 8. The lower end of the duct 7 is open to the cushion space 3. The vehicle is propelled over the water 2 by an air-screw propulsion unit 9. The flexible skirt 5 is of the form disclosed in FIGURES 1 to 7 of U.S. Patent No. 3,420,329, to which reference should be made.

In operation, should the vehicle 1 encounter a wave 10 large enough to contact the bottom surface 11 of the vehicle body 4, because the wave 10 is moving rearwardly relative to the vehicle, a substantial volume of cushion air is swept out of the cushion space 3 as the rear portion of the skirt 5 will deflect to allow the air to escape. This displacement of cushion air from the cushion space 3 results in a reduction ($-ve$) in cushion pressure at the front end of the cushion space and an increase in cushion pressure ($+ve$) at the rear end thereof.

The cushion pressure differential results in the application of an upward thrust 15 to the rear end of the vehicle body 4, creating an anti-clockwise moment about the centre of gravity (C.G.) of the vehicle. This moment tends to pitch the front end of the vehicle into the water 2.

With reference now to FIGURES 2 to 4, in accordance with the invention, the vehicle 1 is modified by the provision of structural means disposed at the front end of the cushion space 3 and adapted, by its form, to restrain waves encountered by the vehicle from contacting the major part of the bottom surface 11 of the vehicle body so that a substantial clearance is maintained between the surface 11 and the water 2 beneath the vehicle body 4, whereby cushion gas may flow from one side of the wave 10 to the other side thereof.

The said means comprise, in this example, a wedge-like member 18 of rigid construction attached to the bottom surface 11 of the vehicle body, within the cushion space 3 and at the front end thereof. As shown in FIGURE 4, the sides 18a of the member 18 converge towards the forward end of the vehicle so that the "apex" of the member 18 is disposed towards the front of the vehicle. As shown in FIGURE 3, the member extends across substantially the full width of the bottom surface 11.

With reference to FIGURE 2, in operation, when the vehicle 1 encounters a large wave, the member 18 reduces the height of the wave by severing or displacing the top of the wave as it enters the cushion space so that as the decapitated" wave passes on through the cushion space 3 substantial clearance 19 is maintained between the bottom surface 11 of the vehicle body and the wave. By "substantial" is meant a clearance sufficient to allow an exchange flow of cushion air from one side of the wave to the other side thereof. In this example, the exchange flow is from the rear end of the cushion space 3 to the front end thereof, whereby a pressure differential between the front and rear ends of the space 3 is substantially avoided.

The wedge-like shape of the member 18 reduces the application of impact loads to the vehicle body 4 caused by contact between the member 18 and large waves. To further reduce impact loads, the converging sides 18a of the member 18 can be increased in length so as to spread the change in momentum of the wave over a longer period. This modification will also require the "apex" angle of the member 18 to be reduced.

If the vehicle 1 is amphibious, the member 18 may serve as a support pad for supporting the vehicle above a land surface when no air cushion is present. When the member 18 provides this function at least one member 22 (FIGURE 2) may be attached to the bottom surface 11 adjacent the rear end of the vehicle body, the member 22 serving only as a support pad.

With reference to FIGURE 3, that portion of the bottom surface 11 disposed rearward of the member 18 may be recessed as shown at 24 so as to increase the clearance 19. This modification is particularly useful where the energy remaining in a "decapitated" wave is such that the wave subsequently extends upwardly to a height which would otherwise reduce the clearance 19. Such extension of a wave is particularly likely to take place where the cushion space 3 is of substantial length.

The means for restraining the waves from contacting a major part of the bottom surface 11 of the vehicle body 4 may comprise providing the vehicle body with a stepped bottom surface. With reference to FIGURE 5, the bottom surface 11 has a step 25 disposed adjacent the front end of the cushion space 3 and extending laterally for substantially the full width of the bottom surface 11. The bottom surface may also be recessed, rearwardly of the step 25 as at 24 in FIGURE 3.

In operation, large waves encountered by the vehicle 1 contact that portion of the bottom surface 11 forward of the step 25 and are restrained from contacting the remainder of the surface 11 by depressing the wave tops, whereby the clearance 19 is maintained.

If necessary, a further step can be provided rearward, as indicated at 26. Alternatively, a member similar to member 18 of FIGURE 3 may be provided in place of the step 26.

I claim:
1. A gas-cushion vehicle for operation over a water surface comprising a body having an underside which, when said vehicle is operating, is spaced from said water surface, means for producing a vehicle-supporting gas cushion in the space beneath said underside, said space being defined by said underside and at least at the front and the rear of the vehicle by a skirt of flexible material depending from said body and below said underside, and a member within said space adjacent the front end thereof, said member having a surface extending below the part of said underside disposed rearwardly of said surface, the lowermost portion of said member being upwardly spaced from said water surface and from the lowermost portion of said skirt, so that said surface is operative to restrain waves encountered by the vehicle from contacting the said rearwardly disposed part of said underside so that a clearance is maintained between said rearwardly disposed part of said underside and a wave, through which clearance cushion gas may flow to prevent the creation of a pressure differential between the front and rear ends of the cushion space due to the sweeping action of waves.

2. A vehicle as claimed in claim 1 wherein the said surface is provided by means so formed as to sever the tops of waves which would otherwise contact said rearwardly disposed part of the underside of the vehicle body.

3. A vehicle as claimed in claim 1 adapted to operate over land as well as water, wherein said member also supports the vehicle when said vehicle is at rest on a land surface.

4. A vehicle as claimed in claim 1 wherein said rearwardly disposed part of the underside is recessed so as to increase the said clearance.

5. A vehicle as claimed in claim 1 wherein the said member comprises a rigid structure secured to the underside of the vehicle body having side parts converging towards the forward end of the vehicle, whereby impact loads caused by contact between the structure and waves are substantially reduced.

6. A vehicle as claimed in claim 1 wherein the underside of the vehicle body is stepped at the forward end of the cushion space to define the said surface.

References Cited

UNITED STATES PATENTS

| 1,412,848 | 4/1922 | Dunajeff. | |
| 1,621,625 | 3/1927 | Casey. | |
| 3,078,938 | 2/1963 | Bollum | 180—116 |
| 3,137,262 | 6/1964 | Tibbetts et al. | 180—128 X |
| 3,207,113 | 9/1965 | Tattersall | 180—126 X |

A. HARRY LEVY, Primary Examiner